US012589950B2

(12) United States Patent　(10) Patent No.: US 12,589,950 B2
Kimura　(45) Date of Patent: Mar. 31, 2026

(54) OBJECT RECOGNITION SYSTEM FOR PICKING UP ITEMS

(71) Applicant: HITACHI, Ltd., Tokyo (JP)

(72) Inventor: Nobutaka Kimura, Holland, MI (US)

(73) Assignee: HITACHI, LTD., Tokyo (JP)

(*) Notice: Subject to any disclaimer, the term of this patent is extended or adjusted under 35 U.S.C. 154(b) by 461 days.

(21) Appl. No.: 18/226,619

(22) Filed: Jul. 26, 2023

(65) Prior Publication Data

US 2025/0033899 A1　Jan. 30, 2025

(51) Int. Cl.
B65G 47/90　(2006.01)

(52) U.S. Cl.
CPC .... B65G 47/905 (2013.01); *B65G 2203/0208* (2013.01); *B65G 2203/041* (2013.01)

(58) Field of Classification Search
CPC .......... B65G 47/905; B65G 2203/0208; B65G 2203/041; B25J 13/08
See application file for complete search history.

(56) References Cited

U.S. PATENT DOCUMENTS 8,248,620 B2　8/2012　Wicks et al.
10,343,857 B2　7/2019　Morency et al.

11,176,674 B2　11/2021　Diankov et al.
2015/0066199 A1　3/2015　Shimono
2022/0126446 A1*　4/2022　Chen ..................... G06V 20/10

FOREIGN PATENT DOCUMENTS

JP　2020121346 A　8/2020

* cited by examiner

*Primary Examiner* — Bao Long T Nguyen
(74) *Attorney, Agent, or Firm* — PROCOPIO, CORY, HARGREAVES & SAVITCH LLP

(57) ABSTRACT

A system for object loading recognition associated with a plurality of objects, which may include a sensor for measuring distances between the sensor and the plurality of objects; a linear slider, wherein the sensor is coupled to the linear slider and is moved linearly by the linear slider; a processor; and a memory coupled to the processor, wherein the memory stores instructions executable by the processor to: measure surfaces of the plurality of objects using the sensor; recognize dimensions, positions, and orientations of the plurality of objects based on the measured surfaces to identify recognized objects; calculate a confidence of each of the recognized objects; identify undistinguishable objects from the recognized objects based on the calculated confidences; calculate an approachable distance for each of the undistinguishable objects; and move the sensor towards the plurality of objects by a distance that corresponds to a minimum approachable distance from the calculated approachable distances.

11 Claims, 14 Drawing Sheets

System can recognize inner objects more accurately by further approaching

Outer objects are out of field sensor view

Limited approach distance

Outer objects can be included in field of sensor view

Related Art

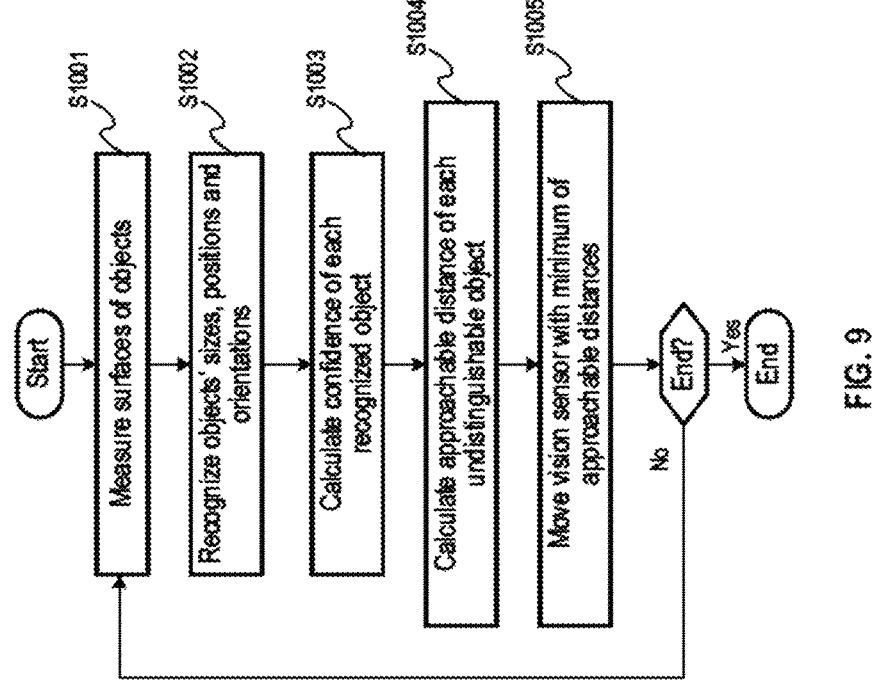

S1001 Measure surfaces of objects

S1002 Recognize objects' sizes, positions and orientations

S1003 Calculate confidence of each recognized object

S1004 Calculate approachable distance of each undistinguishable object

S1005 Move vision sensor with minimum of approachable distances

Start

End? No / Yes

End

FIG. 9

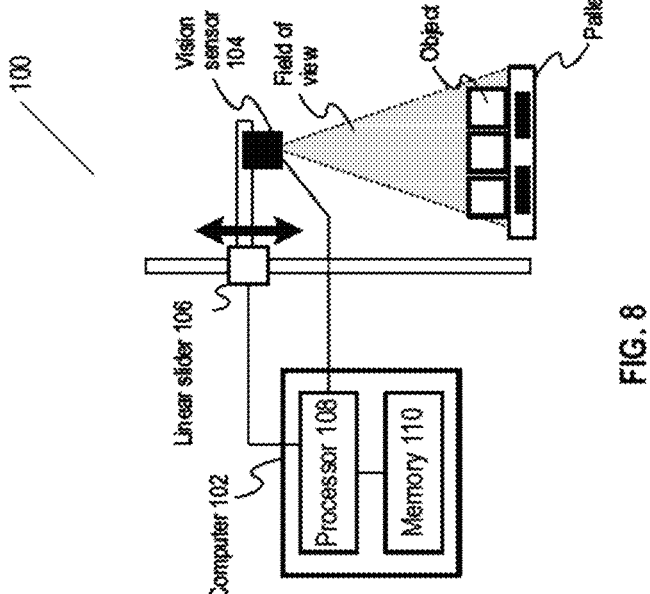

100

Vision sensor 104

Field of view

Object

Pallet

Linear slider 106

Computer 102

Processor 108

Memory 110

FIG. 8

OBJECT RECOGNITION SYSTEM FOR PICKING UP ITEMS

FIELD

The present disclosure is generally directed to a method and a system for performing object loading recognition associated with a plurality of objects.

RELATED ART

Automating physical operations through use of automated systems in warehouses have started to become mainstream due to the aging labor forces and increased volatility of the labor market. In performing warehouse operations, the automated systems focus on operations including depalletizing, devanning, and object picking operations, where warehouse workers pick up products from multiple products loaded on pallets or roll-box-pallets, in truck boxes, or in containers.

For automating these operations, autonomously controlled robots which have one or more manipulators and one or more vision systems have been proposed and put to practical use. Generally, products and their arrangements/packaging can vary significantly from one another and automation systems do not receive such preliminarily information in advance. The automation systems/autonomously controlled robots recognize the sizes, positions, and orientations of the products and plan the manipulators' actions for picking up and moving the recognized products based on the recognized information.

In the related art, depalletizer system utilizing a vision sensor fixedly mounted for receiving vision data to generate images and/or 3D models of top objects on the pallet is disclosed. FIG. 1 illustrates a conventional depalletizer system utilizing a single vision sensor fixed on equipment. Such systems require preliminary information such as target object dimensions in order for the systems to function properly, and generation of such information require additional time and resources.

In the related art, method utilizing a manipulator to grasp an area of a detected top surface of an object within unconfident boundaries and displacing the object slightly to increase the boundaries' confidence level. By measuring a result of the displacement, an object can be detected with correct size estimation by measuring the result of the slight displacement. FIG. 2 illustrate a conventional depalletizer system utilizing a manipulator. While slight displacement of objects allows for better object dimension estimation, the process incurs additional time to perform and tends to decrease system throughputs.

In the related art, multiple vision sensors are fixedly mounted to a depalletizer system for measuring objects' top surfaces from the viewpoints of the visions sensors. FIG. 3 illustrates a conventional depalletizer system utilizing multiple fixedly mounted vision sensors. However, use of multiple vision sensors increases price of the depalletizer system and makes it economically unfeasible.

In the related art, depalletizer system having one or more vision sensors mounted on manipulator(s) is disclosed. FIG. 4 illustrates a conventional depalletizer system having a vision sensor mounted on a manipulator. FIG. 5 illustrates a conventional depalletizer system having a vision sensor mounted on a manipulator that is different from an object motion manipulator. As illustrated in FIG. 5, there are two manipulators, one with a vision sensor and one with a hand for object manipulation. If the vision sensor and a hand for grasping objects are mounted on the same manipulator as shown in FIG. 4, the manipulator must temporarily pause to perform measuring of objects. Measurements from high position for recognizing overall object arrangements and low position for accurately recognizing target objects' boundaries are needed, which leads to low system throughput. While the throughput issues may be addressed using two manipulators as shown in FIG. 5, such system becomes too expensive and makes it economically unfeasible.

In the related art, a vertical slider is utilized in a depalletizer system to allow vertical movement of a vision sensor. FIG. 6 illustrates a conventional depalletizer system with a vertical slider. The system can measure objects' top surfaces from above with relatively short distance. However, there are a few issues associated with the use of a vision system utilizing a vertical slider. FIG. 7 illustrates limitations of a depalletizer system utilizing a vertical slider. As illustrated in FIG. 7, the approach distance of the vision sensor can be limited in order to include all objects in the field of view. Hence, slight displacement of object is frequently needed even when the vertical slider is applied.

SUMMARY

Aspects of the present disclosure involve an innovative method for performing object loading recognition associated with a plurality of objects. The method may include measuring distances between a sensor and the plurality of objects using the sensor; moving a linear slider that is coupled to the sensor; measuring surfaces of the plurality of objects using the sensor; recognizing dimensions, positions, and orientations of the plurality of objects based on the measured surfaces to identify recognized objects; calculating a confidence of each of the recognized objects; identifying undistinguishable objects from the recognized objects based on the calculated confidences, wherein the calculated confidences of the undistinguishable objects are lower than a preset confidence threshold; calculating an approachable distance for each of the undistinguishable objects; and moving the sensor towards the plurality of objects by a distance that corresponds to a minimum approachable distance from the calculated approachable distances.

Aspects of the present disclosure involve an innovative system for object loading recognition associated with a plurality of objects. The system may include a sensor for measuring distances between the sensor and the plurality of objects; a linear slider, wherein the sensor is coupled to the linear slider and is moved linearly by the linear slider; a processor; and a memory coupled to the processor, wherein the memory stores instructions executable by the processor to: measure surfaces of the plurality of objects using the sensor; recognize dimensions, positions, and orientations of the plurality of objects based on the measured surfaces to identify recognized objects; calculate a confidence of each of the recognized objects; identify undistinguishable objects from the recognized objects based on the calculated confidences, wherein the calculated confidences of the undistinguishable objects are lower than a preset confidence threshold; calculate an approachable distance for each of the undistinguishable objects; and move the sensor towards the plurality of objects by a distance that corresponds to a minimum approachable distance from the calculated approachable distances.

Aspects of the present disclosure involve an innovative system for performing object loading recognition associated with a plurality of objects. The system may include means for measuring distances between the measuring means and the plurality of objects; means for moving the measuring means linearly; means for measuring surfaces of the plurality of objects using the measuring means; means for recognizing dimensions, positions, and orientations of the plurality of objects based on the measured surfaces to identify recognized objects; calculating a confidence of each of the recognized objects; means for identifying undistinguishable objects from the recognized objects based on the calculated confidences, wherein the calculated confidences of the undistinguishable objects are lower than a preset confidence threshold; means for calculating an approachable distance for each of the undistinguishable objects; and means for moving the measuring means towards the plurality of objects by a distance that corresponds to a minimum approachable distance from the calculated approachable distances.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 8 illustrates an example object loading recognition system 100, in accordance with an example implementation.

FIG. 9 illustrates an example process flow for object recognition using the object loading recognition system 100 of FIG. 8, in accordance with an example implementation.

DETAILED DESCRIPTION

Figure 2:
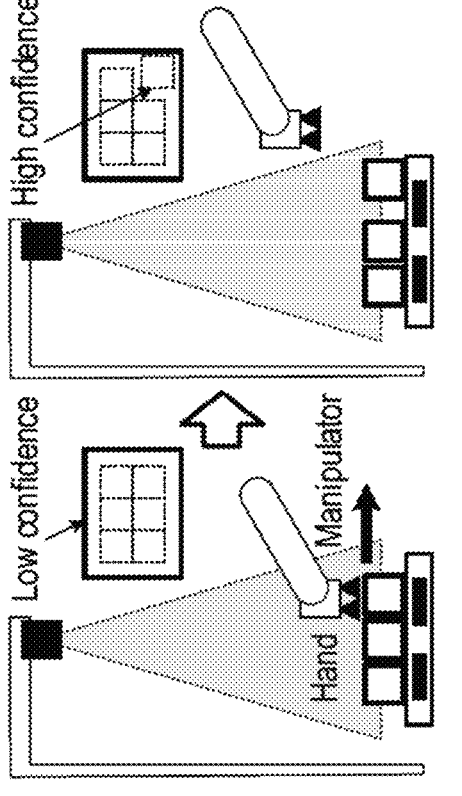
FIG. 2 illustrates a conventional depalletizer system utilizing a manipulator.
Figure 1:
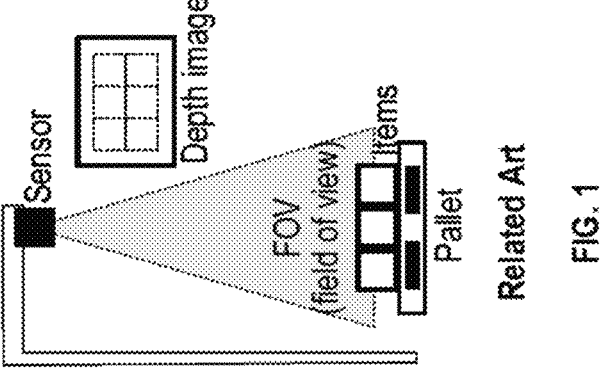
FIG. 1 illustrates a conventional depalletizer system utilizing a single vision sensor fixed on equipment.
Figure 5:
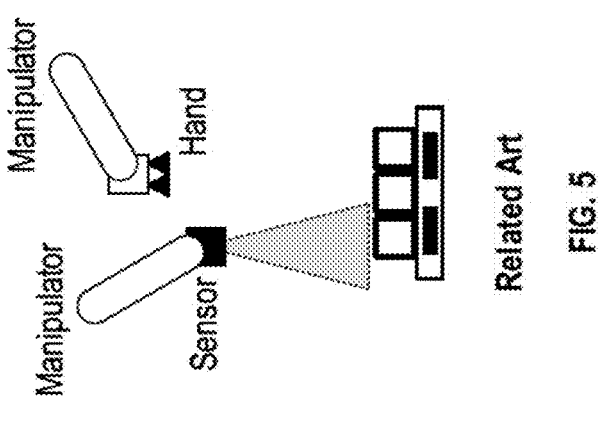
FIG. 5 illustrates a conventional depalletizer system having a vision sensor mounted on a manipulator that is different from an object motion manipulator.
Figure 4:
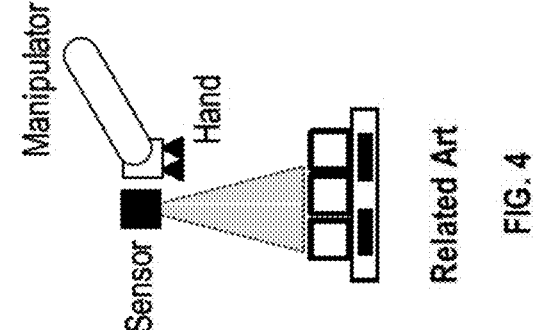
FIG. 4 illustrates a conventional depalletizer system having a vision sensor mounted on a manipulator.
Figure 3:
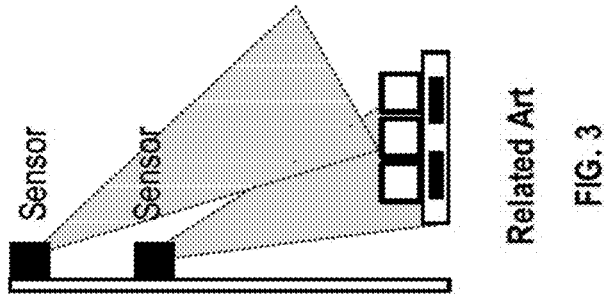
FIG. 3 illustrates a conventional depalletizer system utilizing multiple fixedly mounted vision sensors.
Figures 6, 7:
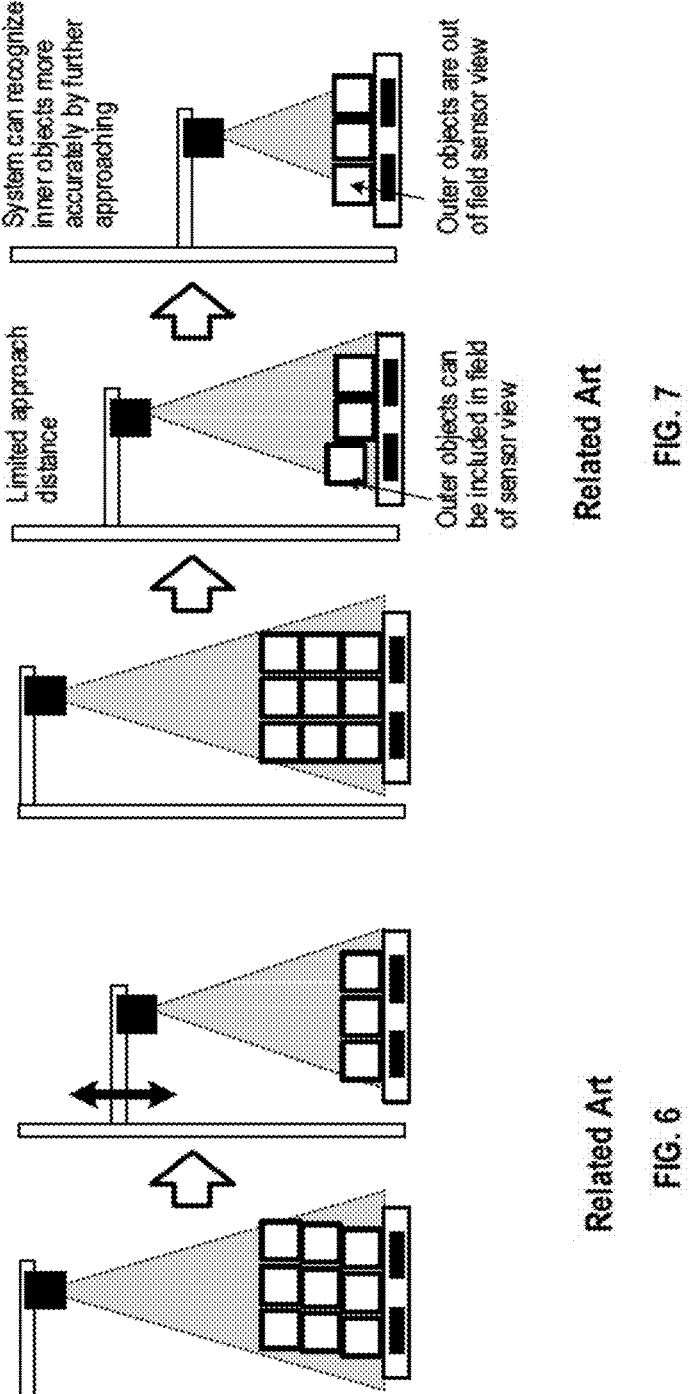
FIG. 6 illustrates a conventional depalletizer system with a vertical slider.
FIG. 7 illustrates limitations of a depalletizer system utilizing a vertical slider.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be implemented through any means according to the desired implementations.

Example implementations decrease the frequency of slight displacement of unclear objects and the amount of vertical movement of the sensor in the system through use of a vertical slider. At the same time, the system allows for picking up objects from various kinds of objects loaded on pallets or in containers.

FIG. 8 illustrates an example object loading recognition system 100 for object loading recognition associated with a plurality of objects, in accordance with an example implementation. As illustrated in FIG. 8, the system may include a computer 102, a vision sensor 104, and a linear slider 106. The computer 102 may include a processor 108 and a memory 110. The vision sensor 104 can be one of a time of flight (TOF) camera, stereo camera, etc., for measuring distances to the objects in the field of view. The linear slider 106 can move the vision sensor 104 vertically/linearly so as to move the vision sensor 104 towards or away from the objects on a pallet.

Figure 10:
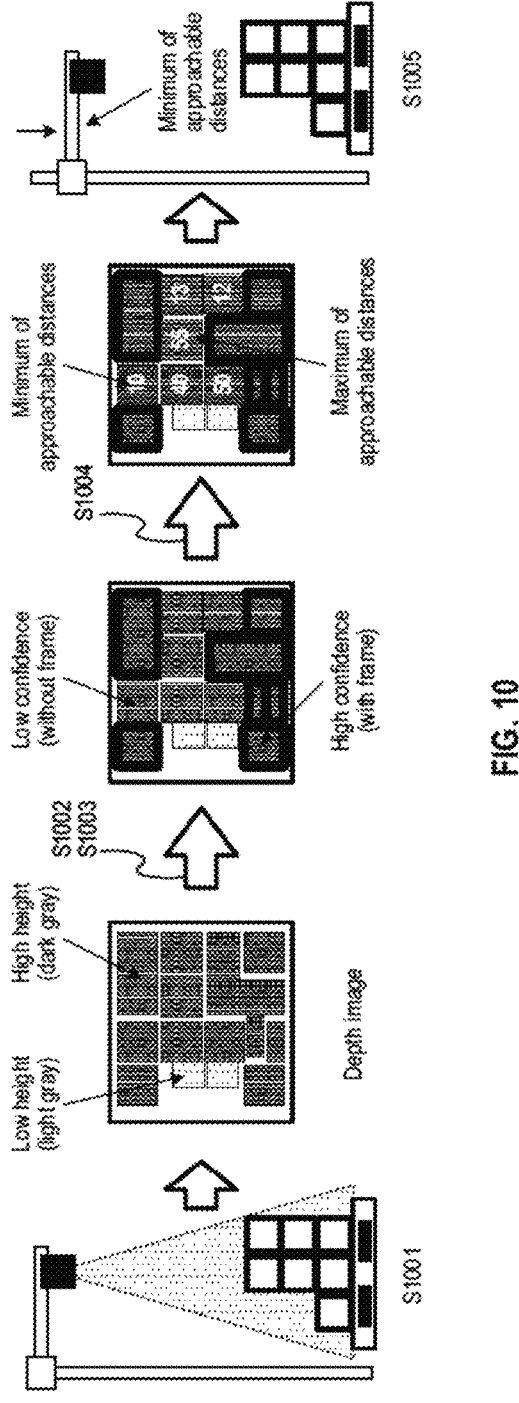
FIG. 10 illustrates an example illustrative flow of the object recognition process flow of FIG. 9, in accordance with an example implementation.

FIG. 9 illustrates an example process flow for object recognition using the object loading recognition system 100 of FIG. 8, in accordance with an example implementation. FIG. 10 illustrates an example illustrative flow of the object recognition process flow of FIG. 9, in accordance with an example implementation.

At S1001, the object loading recognition system 100 measures the surfaces of the objects using the vision sensor 104. The second illustration of FIG. 10 illustrates the measured result of S1001, with the object heights represented in varying shadings/patters. For example, objects measured as having lower heights will have a lighter shade or dotted pattern when compared and contrasted to objects measured as having higher heights. At S1002, the system recognizes the objects' sizes, positions, and orientations using the measured results.

At S1003, after performing the recognition process, the system then calculates a confidence of each recognized results. If the curvature change of the estimated surface boundary is relatively large and clear, the confidence is set to high. Otherwise, the confidence is set to low. Additionally, if there are few lines of curvature change on the surface, the confidence is set to high. Otherwise, the confidence is set to low. As shown in the third illustration of FIG. 10, the recognized objects with confidences equal to or higher than a preset confidence threshold are outlined with black frames. The recognized objects with high confidences are referred to as "distinguishable objects" and objects with low confidences are referred to as "undistinguishable objects."

The system tries to move the vision sensor 104 towards the objects in order to clearly measure the curvature change of their surfaces from a position closer to them. In other words, the system tries to increase the confidence of each recognized object by moving the vision sensor 104 closer to the objects.

At S1004, the system also calculates an approachable distance for each undistinguishable object based on an angle of the vision sensor 104's field of view and its recognition results. The approachable distance of an object is the maximum movement amount/distance of the vision sensor 104 that the field of view is still able to capture an object as a whole. As shown in the fourth illustration of FIG. 10, a value is generated for each undistinguishable object. The minimum of approachable distances is 10 centimeter as shown in the figure.

At S1005, the system moves the vision sensor 104 with the minimum approachable distance using the linear slider 106. Even when the vision sensor 104 is moved by the minimum approachable distance, all objects still remain in the field of view of the vision sensor 104. The system can then try to recognize the undistinguishable objects again at the closer position than the previous recognition process.

The system can make the vision sensor 104 approach each of the loaded objects as close as possible while moving the vision sensor 104 little by little. Therefore, an expensive slider providing for quickly sensor sliding movement is not required.

Figure 11:
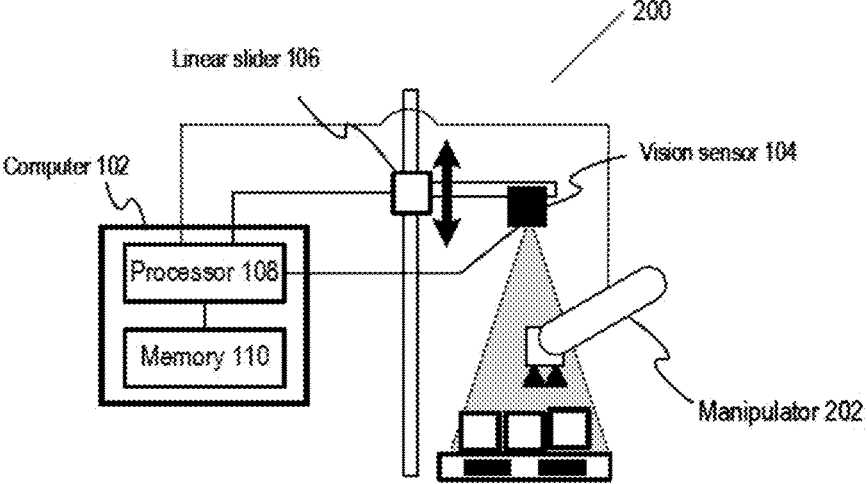
FIG. 11 illustrates an example object loading recognition system 200 having a manipulation system, in accordance with an example implementation.

FIG. 11 illustrates an example object loading recognition system 200 having a manipulation system, in accordance with an example implementation. Similar to FIG. 8, a depalletizing operation is selected as an example. The object loading recognition system 200 includes a manipulator 202 that can grasp and move objects in addition to the components illustrated in FIG. 8. The processor 108 can be used to control the manipulator 202.

Figure 12:
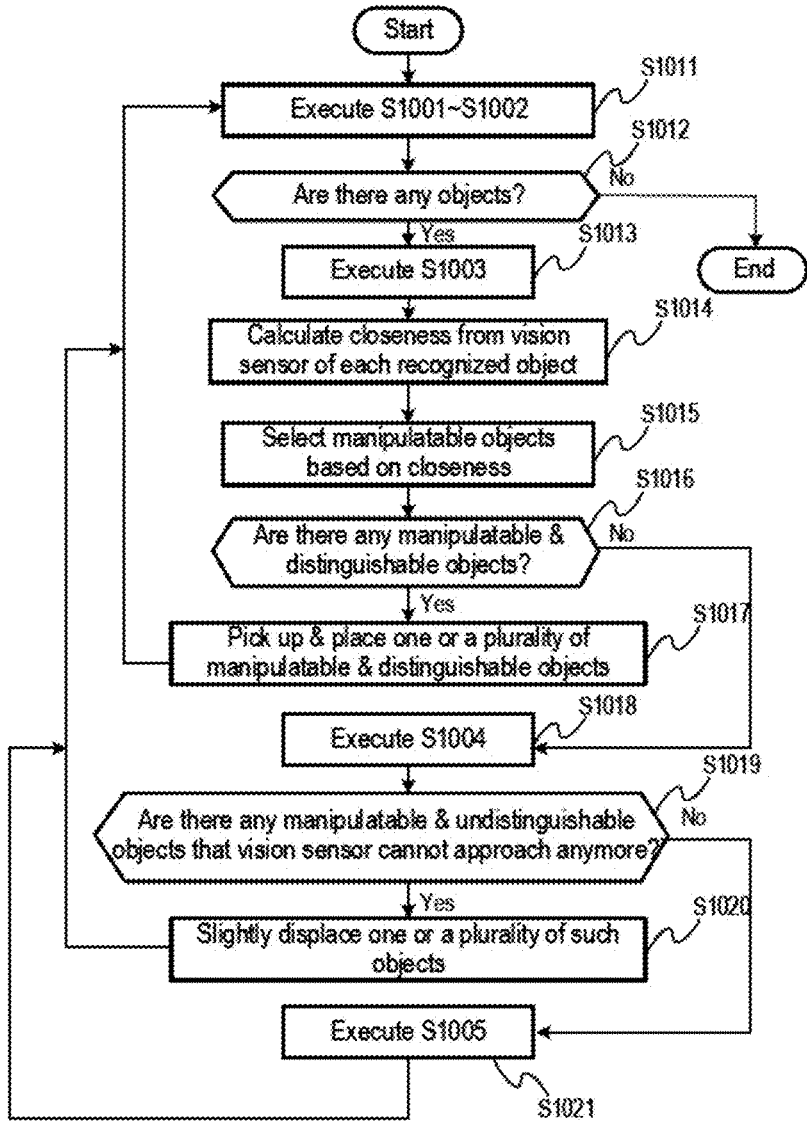
FIG. 12 illustrates an example process flow for object recognition using the object loading recognition system 200 of FIG. 11, in accordance with an example implementation.
Figure 13:
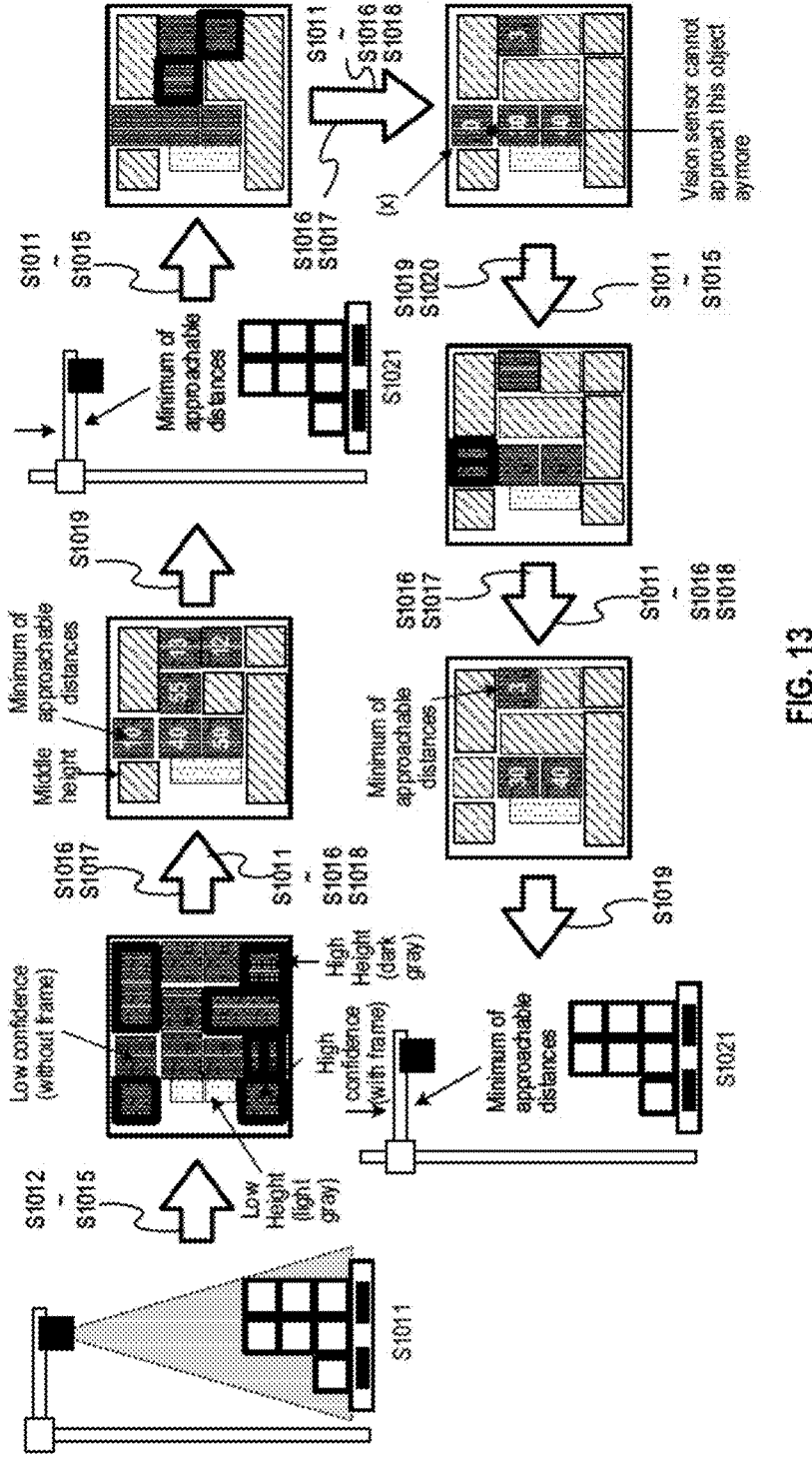
FIG. 13 illustrates an example illustrative flow of the object recognition process flow of FIG. 12, in accordance with an example implementation.

FIG. 12 illustrates an example process flow for object recognition using the object loading recognition system 200 of FIG. 11, in accordance with an example implementation. FIG. 13 illustrates an example illustrative flow of the object recognition process flow of FIG. 12, in accordance with an example implementation.

As illustrated in FIG. 12, at S1011, the system executes processes S1001 and S1002 of FIG. 10 to measure surfaces of objects and recognize objects' sizes, positions, and orientations. At S1012, a determination is made as to whether there is any object to be recognized based on the result of S1002. If the answer is no, then the process comes to an end. Otherwise, the process continues to S1013, where S1003 of FIG. 10 is performed to populate confidence of each recognized object. At S1014, the system calculates closeness/distance from the vision sensor 104 to each recognized object.

At S1015, the system selects manipulatable objects from the recognized objects. Firstly, the system determines the object closest to the vision sensor based on the calculated closeness/distance. The system then selects objects whose closeness can be included in the same level as the closest object. The manipulator cannot address objects relatively far from the manipulator and the vision sensor because the manipulator might collide closer objects. Hence, the system regards the selected objects as the manipulatable objects. For example, if a difference between the closeness of one object and the closest object is less than a preset distance threshold, the system can regard that the object's closeness is included in the same level as the closest object. As illustrated in FIG. 13, objects in darkest shading are selected as manipulatable objects.

At S1016, a determination is made as to whether there is any manipulatable and distinguishable object left. If there are any manipulatable (selected) and distinguishable objects, the system picks up/grasp and places these objects at S1017. After the picking operation, the system repeats the process from S1011 until there is no manipulatable and distinguishable objects left.

If there are no manipulatable (selected) and distinguishable objects, the system then proceeds to S1018, where S1004 is executed to calculate approachable distance of each manipulatable and undistinguishable object. At S1019, a determination is made as to whether any manipulatable and undistinguishable object exists for which the vision sensor 104 is unable to approach any further. If approachable distances of all manipulatable and undistinguishable objects are larger than zero, in other words, the vision sensor 104 is able to approach all manipulatable and undistinguishable objects, the process continues to S1021, where S1005 is executed to move the vision sensor 104 with a minimum of approachable distances. After completion of step S1021, the process returns to S1011.

On the other hand, if there is at least one manipulatable (selected) and undistinguishable object that the vision sensor 104 is unable to approach, the system then slightly displaces the at least one object at S1020. The manipulator 202 grabs an area near a corner of a target object, and slightly raises up and displaces its hand in the direction without other objects. This motion can help distinguish boundaries between objects. After the slight displacement motion, the process returns to S1011. In FIG. 13, the bottom right illustration shows the step S1020 in progress. By grabbing the area near the corner (x) and displacing the hand slightly, the system can then confidently recognize that there are are two small objects.

As illustrated in FIG. 13, the system picks up and places the two small objects as they become manipulatable and distinguishable, and continues the looping of the sequence.

Next, the situation where approachable distances of objects with lower heights (unselected objects or not-manipulatable objects) shorter than objects with higher heights (selected objects or manipulatable objects) will be described in details. In this situation, it can be dangerous for the system to manipulate objects with lower heights earlier because the manipulator might collide with objects with higher heights.

As described above, the system adjusts the height of the vision sensor 104 to the undistinguishable object with the minimum approachable distance. If the vision sensor 104 cannot approach the focused object any further and if the system cannot manipulate the focused object because there are other objects whose height levels are higher than the focused object, the system cannot complete its picking task because the system is unable to make the focused object distinguishable.

Figure 14:
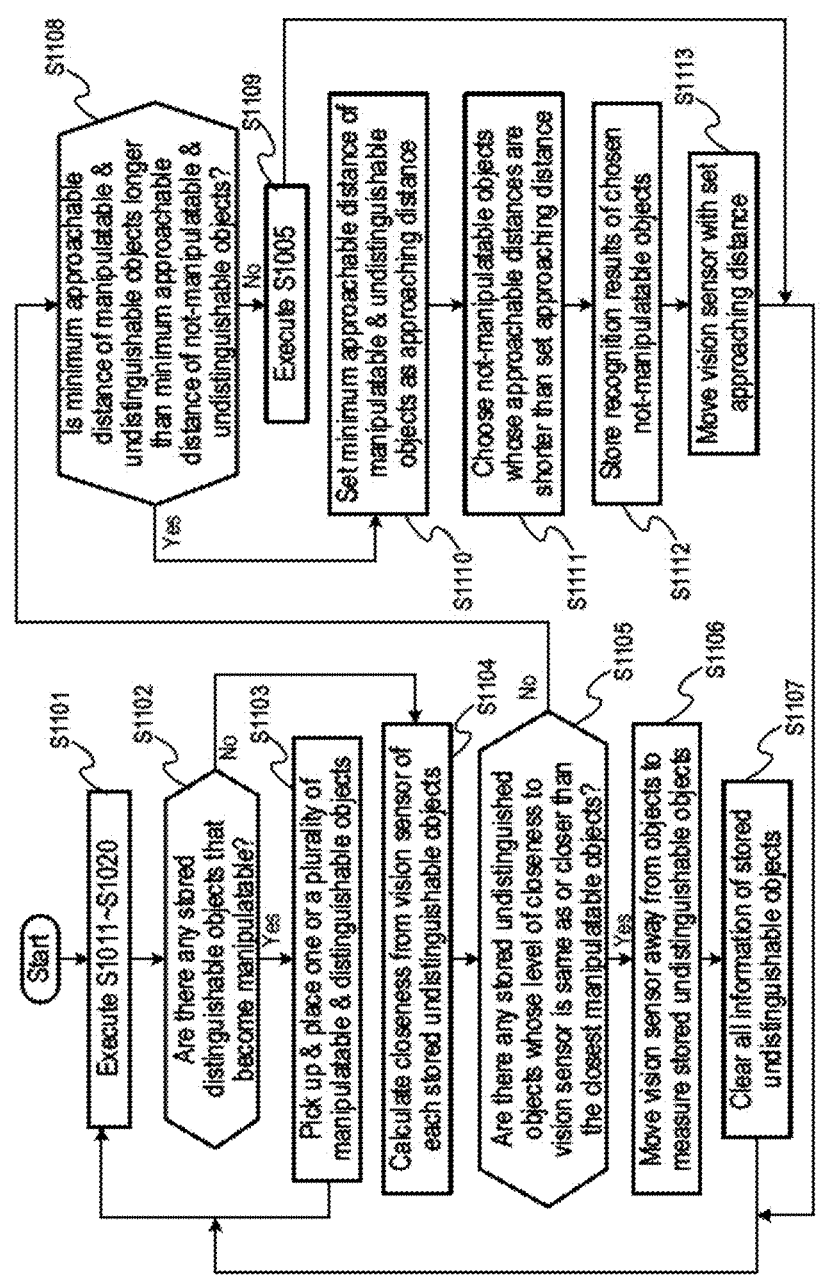
FIG. 14 illustrates an example process flow for object recognition using the object loading recognition system where objects of varying stacking heights are involved, in accordance with an example implementation.
Figure 15:
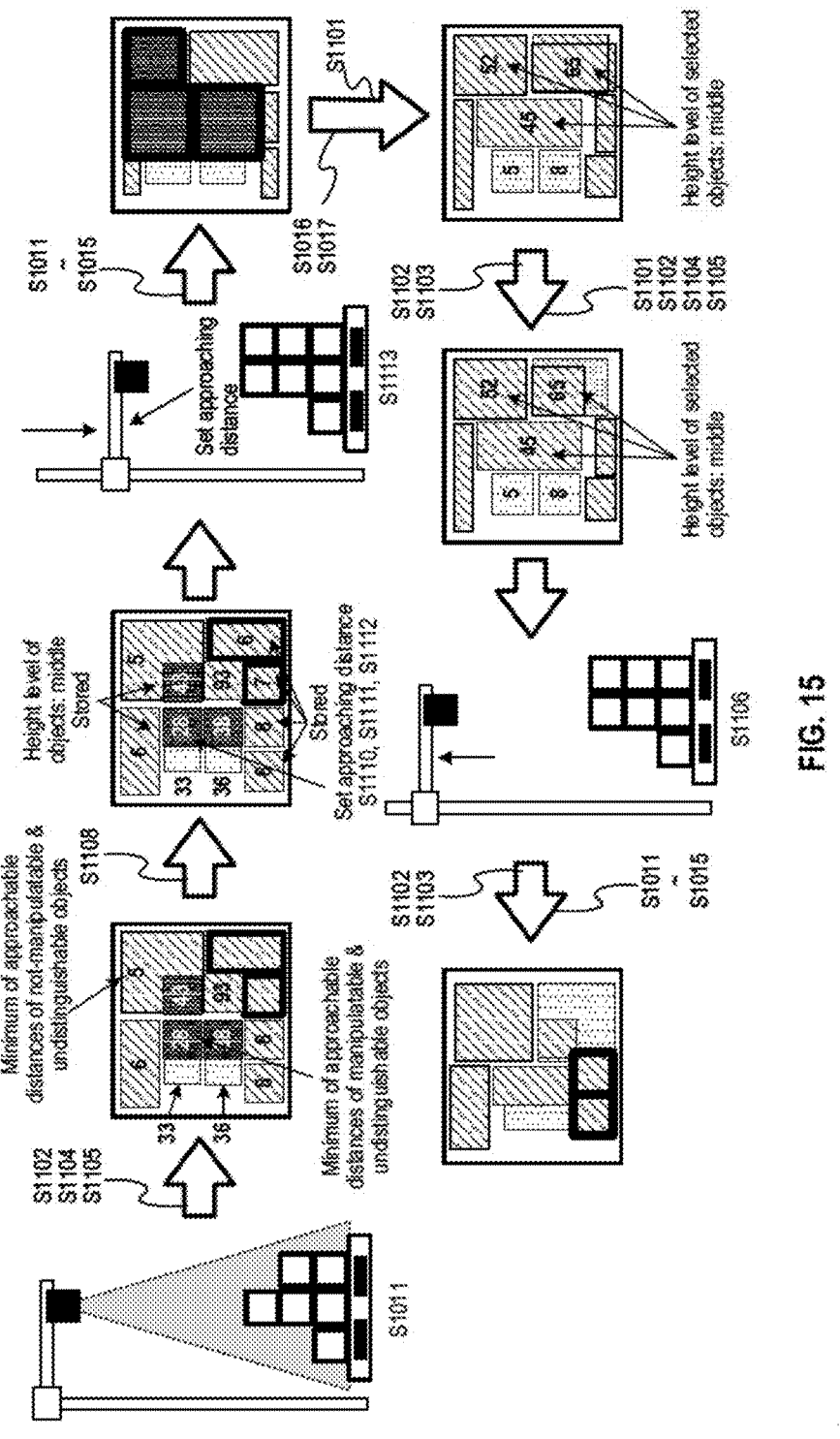
FIG. 15 illustrates an example illustrative flow of the object recognition process flow of FIG. 14 in accordance with an example implementation.

FIG. 14 illustrates an example process flow for object recognition using the object loading recognition system where objects of varying stacking heights are involved, in accordance with an example implementation. FIG. 15 illustrates an example illustrative flow of the object recognition process flow of FIG. 14 in accordance with an example implementation.

Initially, the system starts without any stored information and proceeds with steps S1101-S1105. Because there is no stored information, "No" is selected at both steps S1102 and S1105. In the upper left and upper center figures of FIG. 15, objects with high height level remain at the center of the depth image and objects with middle or low height level are located near the outer frames of the image. As illustrated in FIG. 15, minimum of approachable distances of not-manipulatable (unselected, with middle or low height level) and undistinguishable objects is shorter than the approachable distances of manipulatable (selected, with high height level) and undistinguishable objects because the approachable distances of objects located near the outer frames of a depth image tend to be shorter than those at the center of the image. Referring back to FIG. 14, based on the comparison of the minimum of approachable distances at S1108, "Yes" is selected and the process proceeds to step S1110.

At S1110, the system sets the minimum approachable distance of manipulatable and undistinguishable objects as the next approaching distance of the vision sensor 104. At S1111, the system then chooses the not-manipulatable (unselected) objects having approachable distances that are shorter than the set approaching distance and stores the recognition results (sizes, positions, orientations, and confidences) of the chosen objects at S1112. The system then moves the vision sensor 104 towards the objects using the set approaching distance at S1113.

After moving the vision sensor 104, the system repeats this sequence from measuring and recognizing objects at S1101. As shown in upper right figures of FIG. 15, the captured depth image focuses on the center area of the objects on the pallet. As result of the sensor movement, all remaining manipulatable (selected) objects with high height level are recognized with high confidences. The system can then pick up and place these manipulatable and distinguishable objects. As result of the picking operations, all heights of manipulatable (selected) objects are included in the middle height level. Since all heights of the stored objects are also included in middle height level similar to manipulatable (selected) objects, all of the stored objects have become manipulatable. After receiving this confirmation at S1102, the manipulator 202 then picks up and places the stored manipulatable and distinguishable objects at S1103. After the picking operations, the system removes the stored information of the picked and moved objects.

Since there is now stored information from the first iteration, the system calculates closeness from the vision sensor 104 to each of stored undistinguishable objects at S1104 and confirms whether there are any stored undistinguished objects whose level of closeness to vision sensor 104 is the same as or closer than the closest manipulatable (selected) object at S1105. If the condition is satisfied at S1105, the system then moves the vision sensor 104 away from the objects to the position where the vision sensor 104 can measure the stored undistinguishable objects at S1106. At S1107, the system then clears all information about the stored undistinguishable objects.

Next, a method for simultaneously executing pick up of one of objects and move the vision sensor 104 close to the objects for improving throughputs of picking tasks is described. An issue arises where the vision sensor 104 is unable to measure a surface of an object behind the picked object as result of the movement. If the system can expect the size, position, and orientation of the hidden object, then the system can determine whether it would be possible to measure a surface of an object behind the picked object. In order to generate the expectation, the system would have to know the depth dimension of the picked object.

It is assumed that the system does not receive any object information in advance. Additionally, vision sensor 104 typically have no way of obtaining any information for recognizing depth dimensions of objects before the objects are picked up and moved away.

Figure 16:
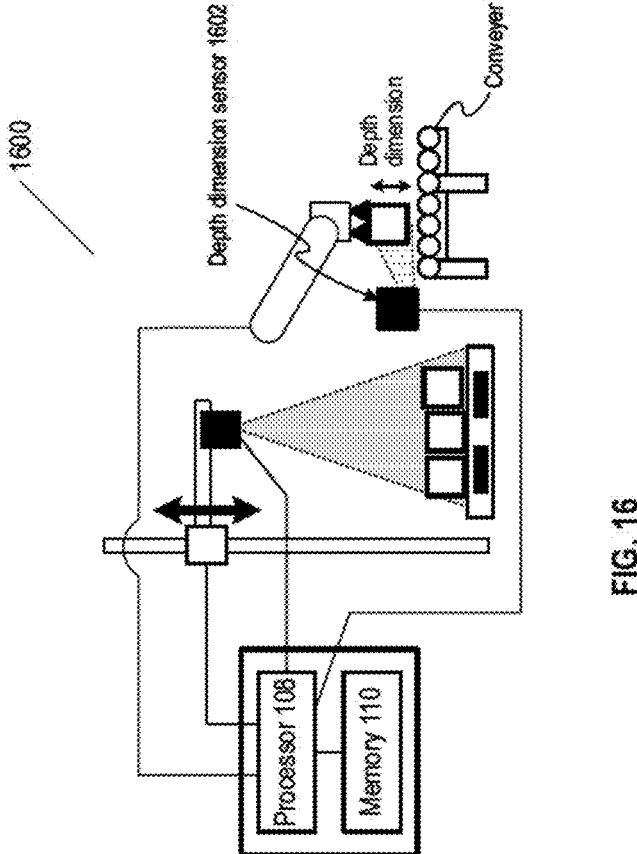
FIG. 16 illustrates an example object loading recognition system 1600 including a depth dimension sensor, in accordance with an example implementation.

On the other hand, depth dimension of a picked object is needed for the manipulator 202 to place the object safely. FIG. 16 illustrates an example object loading recognition system 1600 including a depth dimension sensor, in accordance with an example implementation. As illustrated in FIG. 16, a depth dimension sensor 1602 is included as part of the object loading recognition system 1600 for measuring depth dimension of a picked object. The manipulator 202 carries the picked object to a position where the depth dimension sensor 1602 can measure the picked object. In some example implementations, the depth dimension sensor 1602 is fixedly mounted on one of surrounding equipment. In some example implementations, a TOF camera can be implemented as the depth dimension sensor 1602. In some example implementations, an obstacle sensor using a linear laser can be selected as the depth dimension sensor 1602 using information of the manipulator 202's hand position. If both heights of the depth dimension sensor 1602 and the manipulator 202's hand are known when the depth dimension sensor 1602 detects the bottom of the picked object's side surface, the system can then calculate the depth dimension of the picked object.

Figure 17:
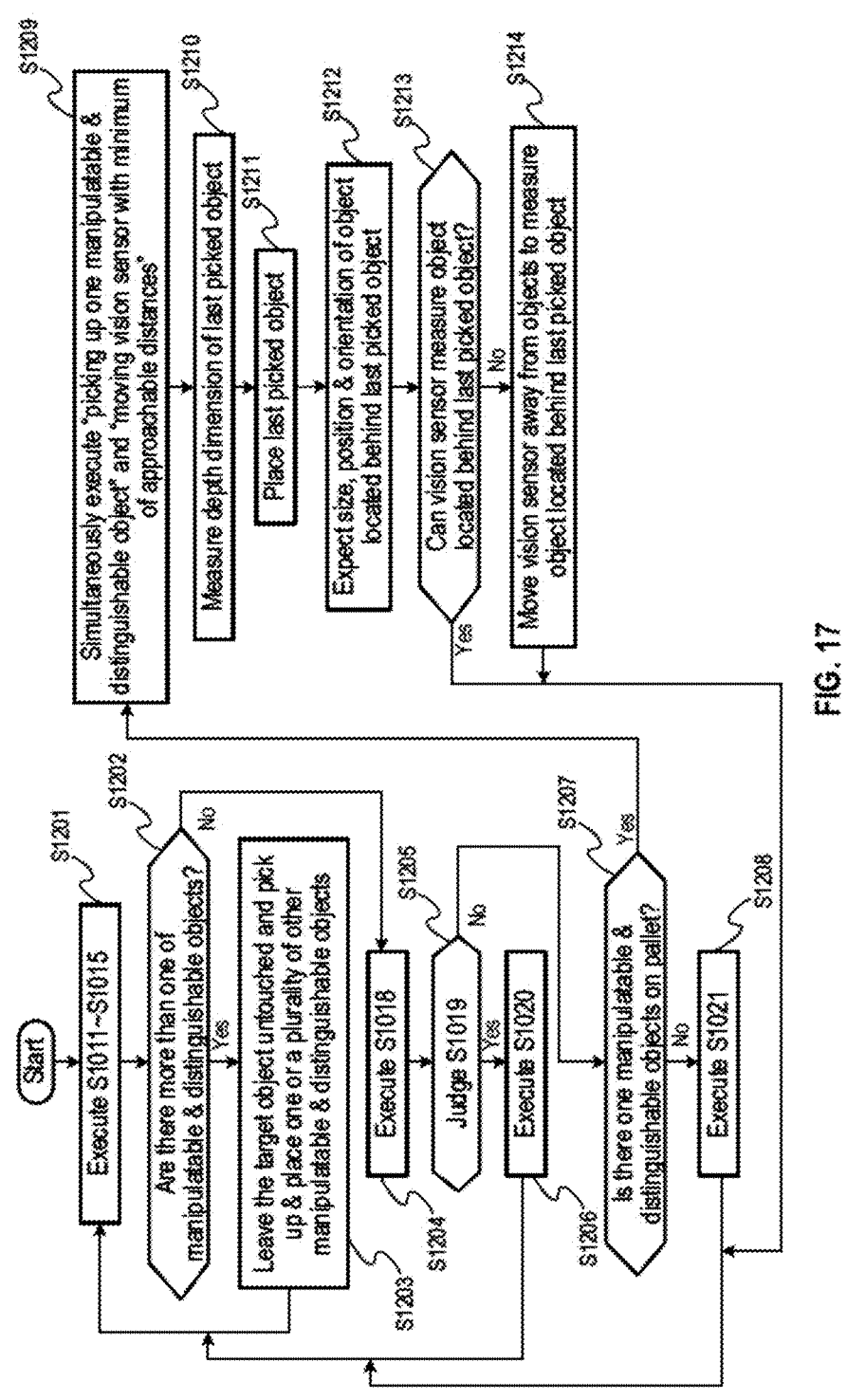
FIG. 17 illustrates an example process flow for object recognition using the object loading recognition system 1600 of FIG. 16, in accordance with an example implementation.
Figure 18:
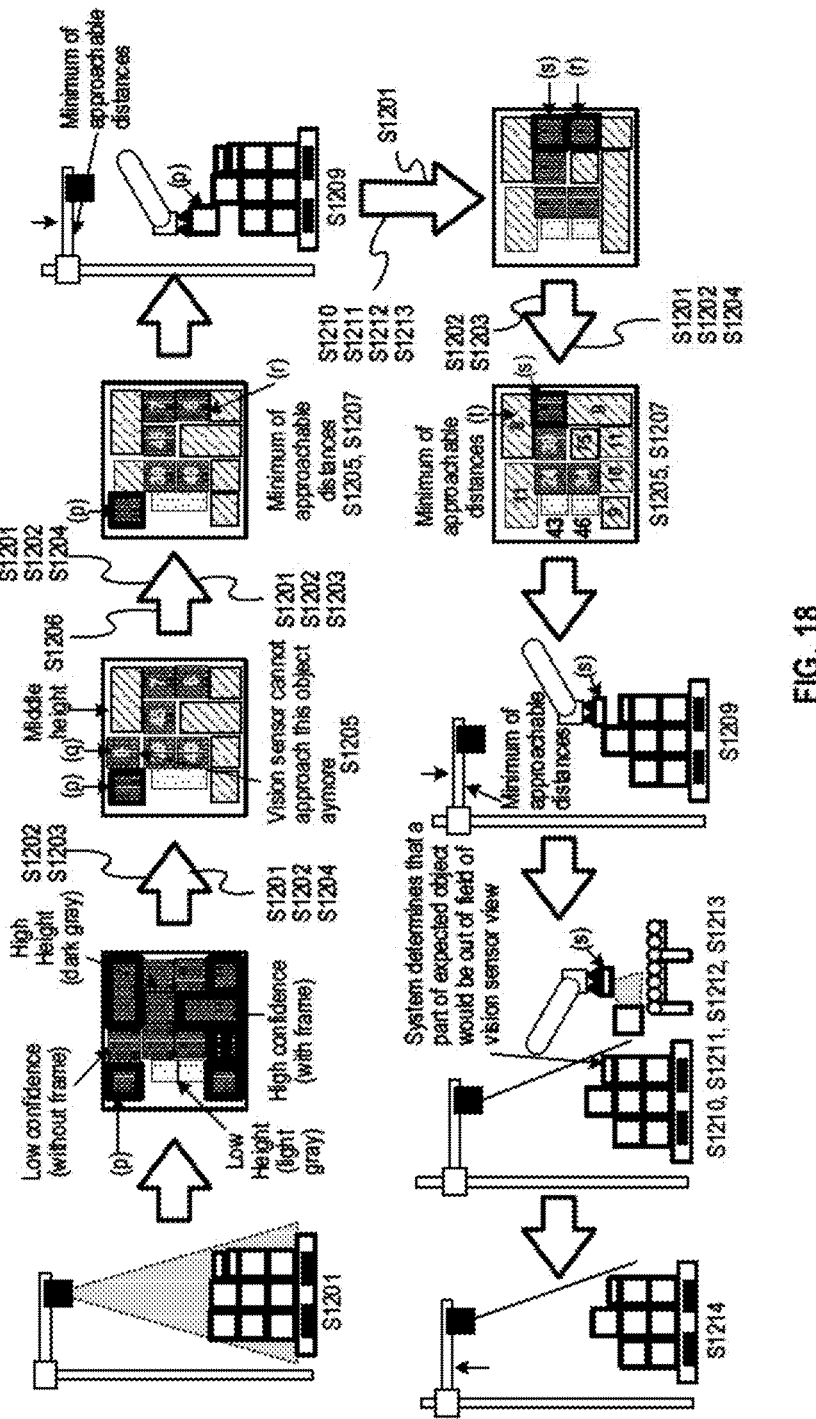
FIG. 18 illustrates an example illustrative flow of the object recognition process flow of FIG. 17, in accordance with an example implementation.

FIG. 17 illustrates an example process flow for object recognition using the object loading recognition system 1600 of FIG. 16, in accordance with an example implementation. FIG. 18 illustrates an example illustrative flow of the object recognition process flow of FIG. 17, in accordance with an example implementation.

At S1201, the system starts and executes processes S1011-S1015. If there are more than one manipulatable (selected) and distinguishable object, the system determines and selects one of the manipulatable (selected) and distinguishable objects as a target object. At S1202, a determination is made as to whether there are more than one manipulatable and distinguishable object. If the answer is yes, then the process continues to S1203. Otherwise, the process continues to S1204. At S1203, the manipulator 202, leaving the target object untouched on the pallet, picks up other manipulatable (selected) and distinguishable objects and removes them from the pallet. As illustrated in FIG. 18, object (p) is determined as the target object.

After repeating steps S1201 and S1202, the system confirms that the number of manipulatable (selected) and distinguishable objects is less than two and calculates the approachable distances of the undistinguishable objects at S1204. Next, the system determines whether there is any manipulatable and undistinguishable object that vision sensor 104 cannot approach any further at S1205. If the answer is yes, then the process continues to S1206, where the system decides to perform and executes the slight object displacement. As illustrated in FIG. 18, the system decides to slightly displace object (q) and executes the slight displacement (described as S1206). On the other hand, if the answer is no at S1205, then the process continues to S1207.

After repeating steps S1201, S1202, and S1204, the system determines not to execute a slight displacement motion at step S1205 and makes the determination whether there is only one manipulatable (selected) and distinguishable object left on the pallet at S1207. If it is determined that only one manipulatable and distinguishable object (target object) is left on the pallet, then the process continues to S1209. Otherwise, the process continues to S1208, where step S1021 is performed. As illustrated in the upper right illustration of FIG. 18, the target object (p) is left on the pallet. The minimum of the approachable distances is 6 centimeters and corresponds to object (r). At S1209, the system simultaneously executes picking up object (p) and moving the vision sensor 104 with the minimum approachable distance (6 centimeters) as shown in the upper right figures of FIG. 18.

After executing process S1209, the system also executes steps S1210, S1211, S1212, and S1213 in sequence, which will be described in more details below. Next, the process returns to S1201, where the system recognizes two manipulatable (selected) and distinguishable objects(s) and (r) as shown in the bottom right illustration of FIG. 18. The system determines to leave object(s) alone, and picks up and places object (r).

After repeating steps S1201, S1202 and S1204, the system determines not to execute a slight object displacement motion at step S1205 because the minimum of approachable distances of undistinguishable objects is not zero. As illustrated in FIG. 18, the minimum approachable distance is 8 centimeters and corresponds to object (t). The system also confirms whether there is only one manipulatable (selected) and distinguishable object left on the pallet at S1207. Then, as shown in the upper center figure of FIG. 18, the system simultaneously executes picking up object(s) and moving the vision sensor 104 with the minimum approachable distance (8 centimeters) corresponding to object (t) at step S1209.

As shown in the bottom left illustrations of FIG. 18, a part of the object behind object(s) becomes out of the field of the vision sensor view because the depth (height) dimension of object(s) is shorter than those of other manipulatable (selected) objects. At S1210, the system, through the depth dimension sensor 1602, measures the depth dimension of the last picked object that the manipulator 202 is grasping before placement of the last picked object. At S1211, the last picked object is placed. The system then expects/estimates the size, position, and orientation of the object located behind the last picked object based on the depth dimension of the last picked object at S1212. For example, the system assumes/estimates that the sizes, 2D positions, and orientations are the same between the surfaces of the last picked object and the hidden object. The depth position of the surface of the hidden object is the sum of that of the last picked object and the measured depth dimension of the last picked object.

After the expectation, the system also estimates whether the vision sensor 104 can measure the object located behind the last picked object based on the expected results and the field of view of the vision sensor 104 at S1213. If the answer is yes at S1213, then the process returns to S1201 to repeat the steps. Otherwise, the process continues to step S1214. At S1214, if the system determines that vision sensor 104 cannot measure the object located behind the last picked object, the system moves the vision sensor 104 away from the objects to a position where the vision sensor 104 can measure the object located behind the last picked object.

Additionally, if assumptions can be made about depth dimension of treated objects, the system avoids the situation where the vision sensor 104 cannot measure a surface of an object behind the picked object as result of moving the vision sensor 104 closer to the objects. In some example implementations, the minimum depth dimension of treated objects can be preset. In this situation, after executing process S1207 in FIG. 17, the system expects an approachable distance that would be located behind the last one of the manipulatable (selected) and distinguishable objects using the preset depth dimension. Next, the system also chooses the smaller of the expected approachable distance and the minimum of the calculated approachable distances corresponding to the recognized undistinguishable objects. After making the decision on the chosen approachable distance (that is the minimum approachable distance of both the recognized undistinguishable objects and the expected object), the system then continues to step S1209 in FIG. 17. By using the chosen approachable distance, step S1210, S1212, S1213, and S1214 of FIG. 17 can be bypassed.

The system tries to better measure the curvature changes of the objects' surfaces and increase the confidence of each recognized object by moving the vision sensor 104 towards the objects. If the confidence of an object is equal to or more than a preset threshold, then the system can directly pick up the object without making slight object displacement.

There is a relationship among a confidence of a recognized object, gaps' widths between the recognized object and surrounding objects, and a distance between the vision sensor 104 and the recognized object. If the distance between the vision sensor 104 and the recognized object is relatively long and the gaps being relatively small, the vision sensor 104 therefore cannot clearly measure the gaps, which in turn leads to decreased confidence. If the vision sensor 104 approaches the recognized object incrementally, the gaps on the measured depth image would become more visible, which leads to increased confidence. On the other hand, if the gaps are relatively large, the vision sensor 104 would be able to measure the gaps even at a distance, which in turn leads to high confidence value being populated.

Therefore, by preliminarily determining the relationship among the confidence, the gaps, and the distance from many combinations of sample data, the required amount of sensor movement for make the confidence equal to or larger than the preset confidence threshold can be generated from the relationship, a current distance, and a current confidence corresponding to a recognized object.

The system expects the minimum required amount of the vision sensor 104 movement corresponding to each undistinguishable object. Then, the system also determines the next movement amount that is the smaller of the minimum of the approachable distances and the minimum of the expected required amount of movements and moves the vision sensor 104 by the determined movement amount.

The foregoing example implementation may have various benefits and advantages. For example, example implementations recognize an arrangement of loaded multiple objects with high confidence and can pick up each of the objects in order while keeping the system cost low and sensor movement to a minimal. An expensive slider for rapid sensor movement is not required. Manipulator motions for slight displacement or object grasping while considering the previously-recognized objects which become out of the field of the sensor's view avoids collision of objects. In addition, unnecessary sensor movement can be skipped when executing sensor movement and the picking motion to improve throughputs.

Figure 19:
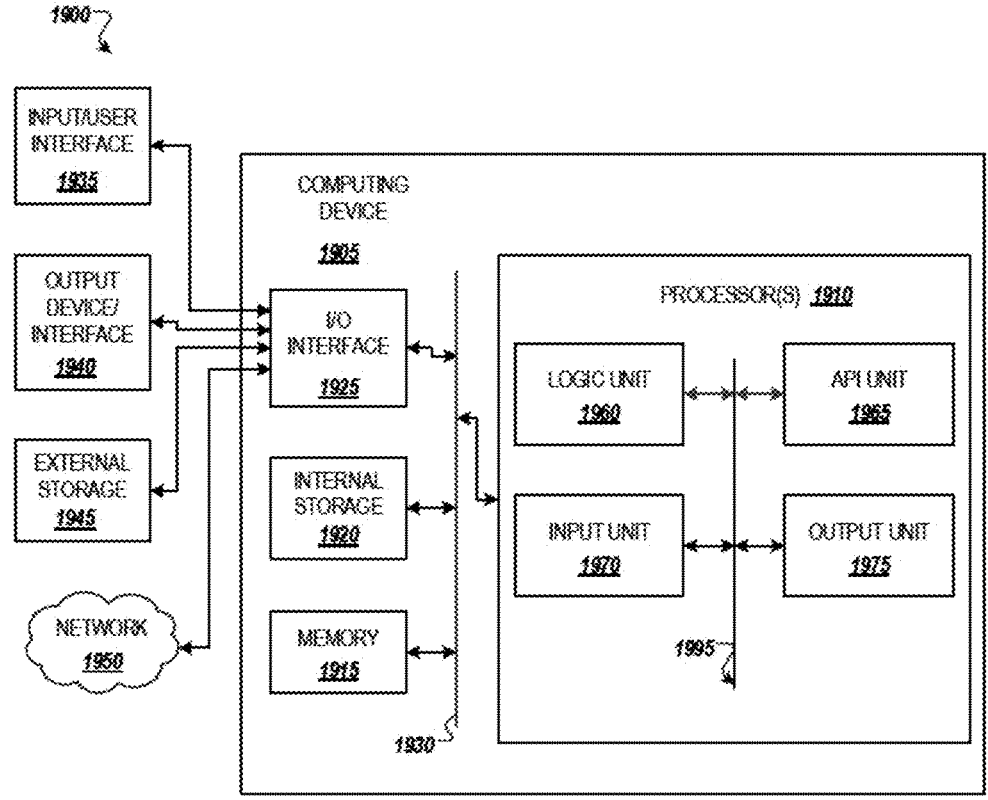
FIG. 19 illustrates an example computing environment with an example computing device suitable for use in some example implementations.

FIG. 19 illustrates an example computing environment with an example computing device suitable for use in some example implementations. Computing device 1905 in computing environment 1900 can include one or more processing units, cores, or processor(s) 1910, memory 1915 (e.g., RAM, ROM, and/or the like), internal storage 1920 (e.g., magnetic, optical, solid-state storage, and/or organic), and/or VO interface 1925, any of which can be coupled on a communication mechanism or bus 1930 for communicating information or embedded in the computing device 1905. VO interface 1925 is also configured to receive images from cameras or provide images to projectors or displays, depending on the desired implementation.

Computing device 1905 can be communicatively coupled to input/user interface 1935 and output device/interface 1940. Either one or both of the input/user interface 1935 and output device/interface 1940 can be a wired or wireless interface and can be detachable. Input/user interface 1935 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1940 may include a display, television, monitor, printer, speaker, braille, or the like. In some example implementations, input/user interface 1935 and output device/interface 1940 can be embedded with or physically coupled to the computing device 1905. In other example implementations, other computing devices may function as or provide the functions of input/user interface 1935 and output device/interface 1940 for a computing device 1905.

Examples of computing device 1905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1905 can be communicatively coupled (e.g., via I/O interface 1925) to external storage 1945 and network 1950 for communicating with any number of networked components, devices, and systems, including one or more computing devices of the same or different configuration. Computing device 1905 or any connected computing device can be functioning as, providing services of, or referred to as, a server, client, thin server, general machine, special-purpose machine, or another label.

I/O interface 1925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1900. Network 1950 can be any network or combination of networks (e.g., the Internet, local area network, wide area network, a telephonic network, a cellular network, satellite network, and the like).

Computing device 1905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks. Blu-ray disks), solid-state media (e.g., RAM, ROM, flash memory, solid-state storage), and other non-volatile storage or memory.

Computing device 1905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python. Perl, JavaScript, and others).

Processor(s) 1910 can execute under any operating system (OS) (not shown), in a native or virtual environment. One or more applications can be deployed that include logic unit 1960, application programming interface (API) unit 1965, input unit 1970, output unit 1975, and inter-unit communication mechanism 1995 for the different units to communicate with each other, with the OS, and with other applications (not shown). The described units and elements can be varied in design, function, configuration, or implementation and are not limited to the descriptions provided. Processor(s) 1910 can be in the form of hardware processors such as central processing units (CPUs) or in a combination of hardware and software units.

In some example implementations, when information or an execution instruction is received by API unit 1965, it may be communicated to one or more other units (e.g., logic unit 1960, input unit 1970, output unit 1975). In some instances, logic unit 1960 may be configured to control the information flow among the units and direct the services provided by API unit 1965, the input unit 1970, and the output unit 1975 in some example implementations described above. For example, the flow of one or more processes or implementations may be controlled by logic unit 1960 alone or in conjunction with API unit 1965. The input unit 1970 may be configured to obtain input for the calculations described in the example implementations, and the output unit 1975 may be configured to provide an output based on the calculations described in example implementations.

Processor(s) 1910 can be configured to measure surfaces of the plurality of objects using the sensor as shown in FIG. 9. The processor(s) 1910 may also be configured to recognize dimensions, positions, and orientations of the plurality of objects based on the measured surfaces to identify recognized objects as shown in FIG. 9. The processor(s) 1910 may also be configured to calculate confidence of each of the recognized objects as shown in FIG. 9. The processor(s) 1910 may also be configured to identify undistinguishable objects from the recognized objects based on the calculated confidences, wherein calculated confidences of the undistinguishable objects are lower than a preset confidence threshold as shown in FIG. 9. The processor(s) 1910 may also be configured to calculate approachable distance for each of the undistinguishable objects as shown in FIG. 9. The processor(s) 1910 may also be configured to move the sensor towards the plurality of objects by a distance that corresponds to a minimum approachable distance from the calculated approachable distances as shown in FIG. 9.

The processor(s) 1910 may also be configured to calculate distance from the sensor to each of the recognized objects as shown in FIG. 12. The processor(s) 1910 may also be configured to select objects from the recognized objects, wherein distance between each of the selected objects and an object closest to the sensor is less than a preset distance threshold as shown in FIG. 12. The processor(s) 1910 may also be configured to grasp, by the manipulator, one of selected distinguishable objects, wherein the selected distinguishable objects are a subset of the selected objects and calculated confidences of the selected distinguishable objects are equal to or higher than the preset confidence threshold as shown in FIG. 12. The processor(s) 1910 may also be configured to move, by the manipulator, the grasped object to a destination area as shown in FIG. 12. The processor(s) 1910 may also be configured to displace, by the manipulator, one of selected undistinguishable objects, wherein the selected undistinguishable objects are a subset of the selected objects and belong to the undistinguishable objects as shown in FIG. 12.

The processor(s) 1910 may also be configured to move the sensor towards the plurality of objects by a distance corresponding to a minimum of all approachable distances of the selected undistinguishable objects if the minimum of all approachable distances of the selected undistinguishable objects is longer than a minimum of all approachable distances of unselected undistinguishable objects, wherein the unselected undistinguishable objects are not a part of the selected objects but belong to the undistinguishable objects as shown in FIG. 14.

The processor(s) 1910 may also be configured to choose objects belonging to unselected objects and having approachable distances shorter than a minimum of all approachable distances of the selected objects as shown in FIG. 14. The processor(s) 1910 may also be configured to store dimensions, positions, and orientations of the chosen objects as shown in FIG. 14.

The processor(s) 1910 may also be configured to calculate distance from the sensor to each of stored distinguishable objects, wherein the stored distinguishable objects are part of the chosen objects and belong to the distinguishable objects as shown in FIG. 14. The processor(s) 1910 may also be configured to confirm whether at least one of the stored distinguishable objects becomes manipulatable using the distance from the sensor of each stored distinguishable object as shown in FIG. 14. The processor(s) 1910 may also be configured to grasp and move the at least one of the stored distinguishable objects that are manipulatable as shown in FIG. 14.

The processor(s) 1910 may also be configured to calculate distance from the sensor to each of stored undistinguishable objects, wherein the stored undistinguishable objects are part of the chosen objects and belong to the undistinguishable objects as shown in FIG. 14. The processor(s) 1910 may also be configured to move the sensor away from the plurality of objects to a position where the sensor can measure at least one of the stored undistinguishable objects if distance difference between distance from a closest selected object to the sensor and distance from a closest stored undistinguishable object to the sensors is smaller than a preset second distance threshold or if the distance of the closest selected object to the sensor is farther than the distance from the closest stored undistinguishable object to the sensor as shown in FIG. 14.

The processor(s) 1910 may also be configured to move the sensor away from the plurality of objects to a position where the sensor can measure all of the chosen objects or all of the stored undistinguishable objects as shown in FIG. 14. The processor(s) 1910 may also be configured to clear information of the stored undistinguishable objects after moving the sensor away from the plurality of objects as shown in FIG. 14.

The processor(s) 1910 may also be configured to, for a number of the selected distinguishable objects being equal to or more than two, continue to grasp and move the selected distinguishable objects to the destination area until all of the selected distinguishable objects have been moved as shown in FIG. 17. The processor(s) 1910 may also be configured to execute, concurrently, movement of the sensor and grasping of last of the selected distinguishable objects as shown in FIG. 17.

The processor(s) 1910 may also be configured to move the last grasped selected distinguishable object to allow the depth dimension sensor to measure a depth dimension of the last grasped selected distinguishable object as shown in FIG. 17. The processor(s) 1910 may also be configured to measure the depth dimension of the last grasped selected distinguishable object as shown in FIG. 17. The processor(s) 1910 may also be configured to estimate a size, a position, and an orientation of a top surface of an object located behind the last grasped selected distinguishable object prior to moving the last grasped selected distinguishable object using the measured depth dimension as shown in FIG. 17. The processor(s) 1910 may also be configured to determine whether the sensor can measure a top surface of the estimated object after moving the sensor and the grasping of last of the selected distinguishable objects, wherein the grasping of last of the selected distinguishable objects moves the last of the selected distinguishable objects away from field of view of the sensor as shown in FIG. 17. The processor(s) 1910 may also be configured to move the sensor away from the plurality of objects to a position where the sensor can measure the top surface of the estimated object as shown in FIG. 17.

The processor(s) 1910 may also be configured to for a number of the selected distinguishable objects being equal to or more than two, continue to grasp and move the selected distinguishable objects to the destination area until all of the selected distinguishable objects have been moved as shown in FIG. 17. The processor(s) 1910 may also be configured to estimate an approachable distance of an object located behind last of the selected distinguishable objects using a preset depth dimension as shown in FIG. 17. The processor(s) 1910 may also be configured to choose smaller of the estimated approachable distance and the minimum approachable distance of the calculated approachable distances as chosen distance as shown in FIG. 17. The processor(s) 1910 may also be configured to execute, concurrently, movement of the sensor with the chosen distance and grasping of the last of the selected distinguishable objects as shown in FIG. 17.

The processor(s) 1910 may also be configured to estimate necessary movement of the sensor to each of the undistinguishable objects, wherein necessary movement is a movable distance of the sensor that increases confidence of an undistinguishable object to or to be larger than the preset confidence threshold as shown in FIG. 17. The processor(s) 1910 may also be configured to move the sensor towards the plurality of objects by a distance that corresponds to smaller of the minimum approachable distance of the calculated approachable distances and a minimum of the necessary movements as shown in FIG. 17.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating." "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to, optical disks, magnetic disks, read-only memories, random access memories, solid-state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored in the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A system for object loading recognition associated with a plurality of objects, the system comprising:
   a sensor for measuring distances between the sensor and the plurality of objects;
   a linear slider, wherein the sensor is coupled to the linear slider and is moved linearly by the linear slider;
   a processor; and
   a memory coupled to the processor, wherein the memory stores instructions executable by the processor to:
      measure surfaces of the plurality of objects using the sensor;
      recognize dimensions, positions, and orientations of the plurality of objects based on the measured surfaces to identify recognized objects;
      calculate confidence of each of the recognized objects;
      identify undistinguishable objects from the recognized objects based on the calculated confidences, wherein calculated confidences of the undistinguishable objects are lower than a preset confidence threshold;
      calculate approachable distance for each of the undistinguishable objects; and
      move the sensor towards the plurality of objects by a distance that corresponds to a minimum approachable distance from the calculated approachable distances.

2. The system of claim 1, further comprising:
   a manipulator that grasps and moves the plurality of objects,
   wherein the memory further storing instructions executable by the processor to:
      calculate distance from the sensor to each of the recognized objects;
      select objects from the recognized objects, wherein distance between each of the selected objects and an object closest to the sensor is less than a preset distance threshold;
      grasp, by the manipulator, one of selected distinguishable objects, wherein the selected distinguishable objects are a subset of the selected objects and calculated confidences of the selected distinguishable objects are equal to or higher than the preset confidence threshold;
      move, by the manipulator, the grasped object to a destination area; and
      displace, by the manipulator, one of selected undistinguishable objects, wherein the selected undistinguishable objects are a subset of the selected objects and belong to the undistinguishable objects.

3. The system of claim 2, wherein the memory further storing instructions executable by the processor to:
   move the sensor towards the plurality of objects by a distance corresponding to a minimum of all approachable distances of the selected undistinguishable objects if the minimum of all approachable distances of the selected undistinguishable objects is longer than a minimum of all approachable distances of unselected undistinguishable objects, wherein the unselected undistinguishable objects are not a part of the selected objects but belong to the undistinguishable objects.

4. The system of claim 3, wherein the memory further storing instructions executable by the processor to:
   choose objects belonging to unselected objects and having approachable distances shorter than a minimum of all approachable distances of the selected objects; and store dimensions, positions, and orientations of the chosen objects.

5. The system of claim 4, wherein the memory further storing instructions executable by the processor to:

calculate distance from the sensor to each of stored distinguishable objects, wherein the stored distinguishable objects are part of the chosen objects and belong to the distinguishable objects;

confirm whether at least one of the stored distinguishable objects becomes manipulatable using the distance from the sensor of each stored distinguishable object; and grasp and move the at least one of the stored distinguishable objects that are manipulatable.

6. The system of claim 4, wherein the memory further storing instructions executable by the processor to:

calculate distance from the sensor to each of stored undistinguishable objects, wherein the stored undistinguishable objects are part of the chosen objects and belong to the undistinguishable objects; and move the sensor away from the plurality of objects to a position where the sensor can measure at least one of the stored undistinguishable objects if distance difference between distance from a closest selected object to the sensor and distance from a closest stored undistinguishable object to the sensors is smaller than a preset second distance threshold or if the distance of the closest selected object to the sensor is farther than the distance from the closest stored undistinguishable object to the sensor.

7. The system of claim 6, wherein the memory further storing instructions executable by the processor to:

move the sensor away from the plurality of objects to a position where the sensor can measure all of the chosen objects or all of the stored undistinguishable objects; and clear information of the stored undistinguishable objects after moving the sensor away from the plurality of objects.

8. The system of claim 2, wherein the memory further stores instructions to:

for a number of the selected distinguishable objects being equal to or more than two, continue to grasp and move the selected distinguishable objects to the destination area until all of the selected distinguishable objects have been moved; and execute, concurrently, movement of the sensor and grasping of last of the selected distinguishable objects.

9. The system of claim 8, further comprising:

a depth dimension sensor that measures depth dimension of the last grasped selected distinguishable object, wherein the memory further stores instructions to:

move the last grasped selected distinguishable object to allow the depth dimension sensor to measure a depth dimension of the last grasped selected distinguishable object;

measure the depth dimension of the last grasped selected distinguishable object;

estimate a size, a position, and an orientation of a top surface of an object located behind the last grasped selected distinguishable object prior to moving the last grasped selected distinguishable object using the measured depth dimension;

determine whether the sensor can measure a top surface of the estimated object after moving the sensor and the grasping of last of the selected distinguishable objects, wherein the grasping of last of the selected distinguishable objects moves the last of the selected distinguishable objects away from field of view of the sensor; and move the sensor away from the plurality of objects to a position where the sensor can measure the top surface of the estimated object.

10. The system of claim 2, wherein the memory further stores instructions to:

for a number of the selected distinguishable objects being equal to or more than two, continue to grasp and move the selected distinguishable objects to the destination area until all of the selected distinguishable objects have been moved;

estimate an approachable distance of an object located behind last of the selected distinguishable objects using a preset depth dimension;

choose smaller of the estimated approachable distance and the minimum approachable distance of the calculated approachable distances as chosen distance; and execute, concurrently, movement of the sensor with the chosen distance and grasping of the last of the selected distinguishable objects.

11. The system of claim 1, wherein the memory further stores instructions to:

estimate necessary movement of the sensor to each of the undistinguishable objects, wherein necessary movement is a movable distance of the sensor that increases confidence of an undistinguishable object to or to be larger than the preset confidence threshold;

move the sensor towards the plurality of objects by a distance that corresponds to smaller of the minimum approachable distance of the calculated approachable distances and a minimum of the necessary movements.

* * * * *